(No Model.) 2 Sheets—Sheet 1.

B. R. BONES.
HARROW.

No. 512,859. Patented Jan. 16, 1894.

Witnesses
Geo. W. Young.
John E. Wiles.

Inventor
Benjamin R. Bones,
By H. G. Underwood
Attorney (No Model.) 2 Sheets—Sheet 2.

B. R. BONES.
HARROW.

No. 512,859. Patented Jan. 16, 1894.

Witnesses
Geo. W. Young
John E. Wiles.

Inventor
Benjamin R. Bones,
By H. G. Underwood
Attorney

United States Patent Office.

BENJAMIN R. BONES, OF MOUNT PLEASANT, ASSIGNOR OF ONE-FOURTH TO COLDWELL C. BEEBE, OF RACINE, WISCONSIN.

HARROW.

SPECIFICATION forming part of Letters Patent No. 512,859, dated January 16, 1894.

Application filed May 1, 1891. Serial No. 391,194. (No model.)

*To all whom it may concern:*

Be it known that I, BENJAMIN R. BONES, a citizen of the United States, and a resident of Mount Pleasant, in the county of Racine, and in the State of Wisconsin, have invented certain new and useful Improvements in Harrows; and I do hereby declare that the following is a full, clear, and exact description thereof.

My invention relates to new and useful improvements in harrows, and relates more particularly to a novel construction in a rotary harrow, in which the revolving scarifiers are made of a spiral form, and provided with concavo-convex cutting edges.

The various features of my invention will be fully described in the following specification and pointed out in the appended claims.

Figure 1:
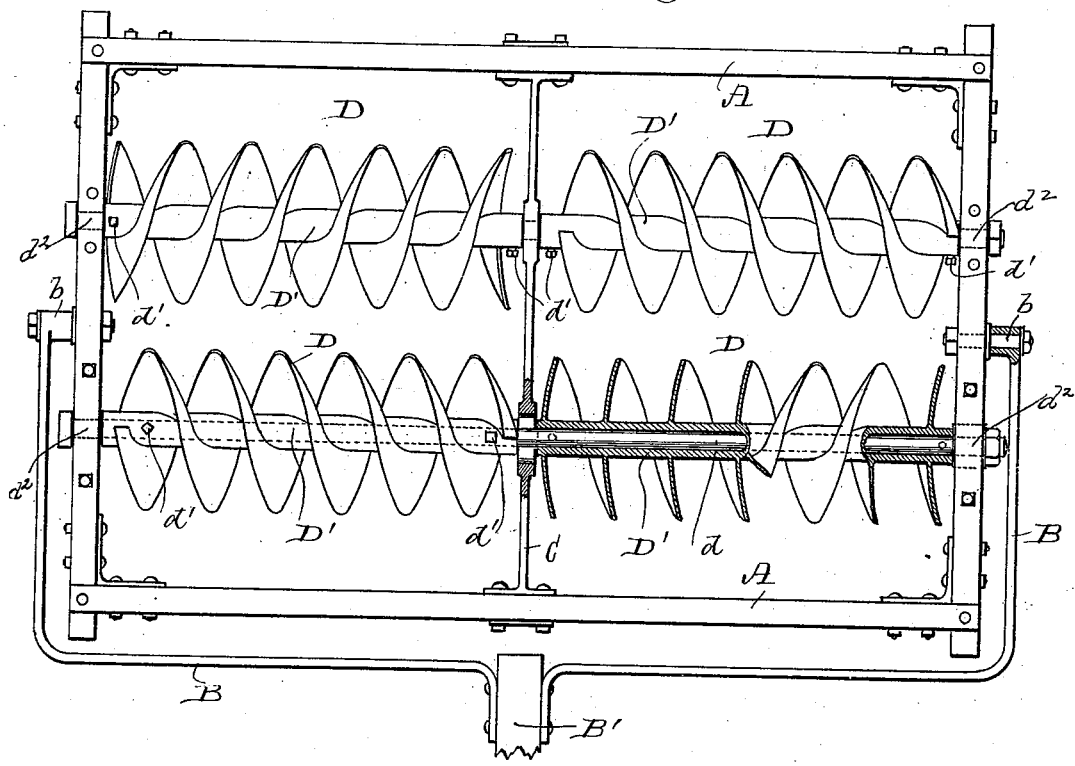
Figure 2:
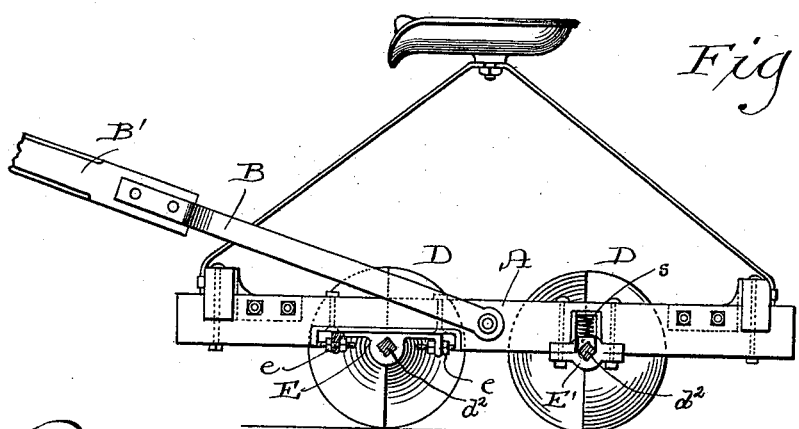
Figure 3:
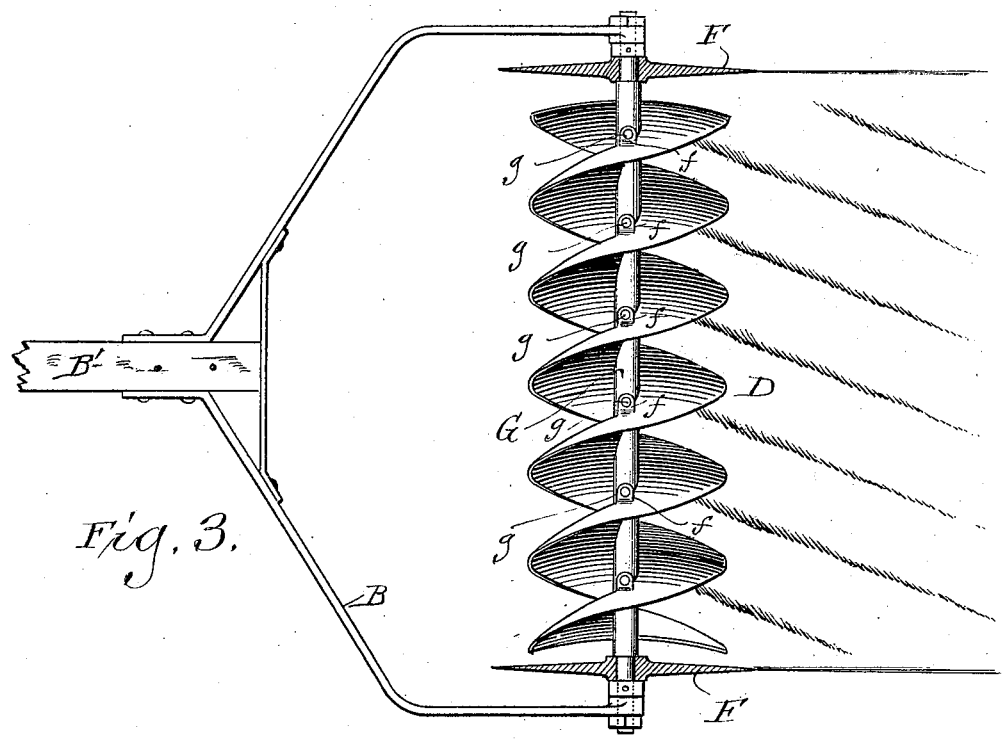
Figure 4:
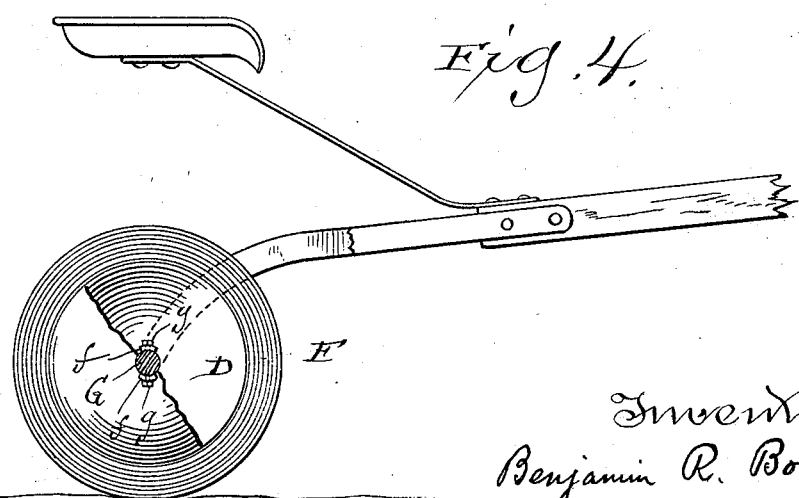

In the accompanying drawings illustrating my invention Figure 1 is a plan view of a rotary harrow embodying my invention. Fig. 2, is a side elevation of the same. Fig. 3, is a plan view of a different form of my improved harrow. Fig. 4, is a side elevation of the same.

In said drawings: A indicates the frame of the machine, B a reversible bail or yoke connected with said frame, and to which the pole B' is attached.

C is the longitudinal bar extending from front to rear of the frame midway between the two side bars thereof.

D D are the revolving spiral scarifiers, made in any desired or convenient manner, as by casting, or by twisting a strip of metal spirally. These spiral cutters are preferably mounted upon sleeves D' which turn freely upon transverse shafts $d$. Any means may be provided for tightening the sleeves D' D' upon the said shafts $d$, as for instance, set screws $d'$ $d'$, by means of which the rotary cutters may be rigidly secured upon the said shafts so as to prevent any rotation of said cutters about said shafts. The transverse shafts $d$ $d$ are rigidly secured in squared bearings $d^2$ $d^2$ in the side bars of the frame A, as shown more particularly in Fig. 2, of the drawings, and one or both of said shafts is preferably made adjustable from front to rear so as to enable the operator to set the cutters upon said shafts nearer together or farther apart as may be desired. Any means may be employed for adjusting said shafts as for instance, the construction shown in Fig. 2, in which the bearings E E of one or both of said shafts are movably engaged with the side bars of the frame, and are adjusted toward the front or the rear of the said frame by means of set screws $e$ $e$.

By reference to the drawings it will be observed that in the form shown in Fig. 1, the rolling blades upon the front and rear shafts are twisted in opposite directions, so that the tendency of the machine to work to one side by the engagement of the spiral cutting edges with the ground will be obviated. I also prefer to divide said cutters centrally, making one half of each with a right hand spiral, and the other end with a left hand spiral, the end of the rear cutter having the left hand twist, being arranged to follow in the rear of the oppositely twisted end of the forward cutter, and the end which is twisted to the right being arranged to follow in the rear of the end of the forward cutter which is twisted to the left. In this manner, the operation of the machine is rendered very uniform, the tendency of one spirally twisted blade to cause the machine to work toward one side, being perfectly counteracted by the oppositely twisted portion. By this construction also, the front and rear blades being twisted in opposite directions, operate to cut the soil diagonally in opposite directions as the rolling cutters pass over the ground.

By the arrangement of the rolling cutters shown when the machine is run in one direction, the concave edges of said rolling cutters will enter the surface of the soil, and will by the rotation of said cutters, lift and thoroughly stir the soil, while by the arrangement of the front and rear cutters with oppositely twisted blades, the said front and rear cutters will more thoroughly act upon the entire surface of the soil by reason of the said cutters stirring the soil in oppositely inclined oblique lines.

By the arrangement of the machine as shown with concavo-convex rolling cutters, and with a reversible pole, whereby the said machine may be run in either direction desired, the machine is adapted for use either as a harrow or a clod crusher, inasmuch as when it is run in a direction to cause the convex surfaces of said rolling blades to engage with the surface of the soil, the said blades will not cut, but will ride upon the surface of the ground, thereby operating to finely pulverize all lumps and clods and serving to "firm" the soil.

Any convenient means may be employed for rendering the pole reversible, as for instance, the construction shown in Fig. 1, in which the yoke or bail B, is pivotally connected with the central portion of each of the side bars of the frame A, as at $b$, so as to permit of said yoke being swung either toward the front or the rear of said frame.

In the form of construction shown in Figs. 3 and 4, but one rolling cutter is employed, and may be composed of two oppositely twisted sections, or of one continuously twisted spiral blade, as shown in said figures.

When the cutter consists of a single continuously twisted spiral blade, I prefer to employ at the ends of the said cutter, two flat sharp edged disks F F, of a considerably larger diameter than the said rotary cutter, and adapted to cut into the surface of the soil so as to prevent the machine from working toward the side, as the rotary cutter acts upon the soil. By the employment of these disks, the harrow is caused to run true to the line of draft.

The form of spiral blade shown in Figs. 3 and 4, is made by twisting a strip of metal spirally about a shaft G, and securing said strip thereto by means of rivets or bolts $g\ g$, said rivets or bolts being passed through apertures in lateral ears or lugs $f\ f$ upon the inner edge of said spirally twisted strip, and into the shaft G.

If desired, the sleeve D' of each of the rolling cutters shown in Figs. 1 and 2, may be tightened so as to prevent said sleeve from turning about the shaft, when the machine may be used as a drag, in which condition, the forward one of each of the pairs of rolling cutters will operate to scrape or work the soil to one side, and the oppositely twisted cutter which follows will again scrape or work the soil in the opposite direction, thus thoroughly stirring the soil and thoroughly pulverizing and breaking up all large clods or lumps.

By the arrangement of the four reversely twisted rolling cutters shown in Fig. 1, the machine may be readily turned about the center, the tendency of the said rolling blades to cause the said machine to work to the side, being equalized, and the operation of turning the machine is further assisted by the two blades upon one side of the machine running upon their convex surfaces, so as to greatly reduce the resistance in turning. It will also be seen that in backing the machine as is often necessary in use, all of the rolling blades will run upon their convex surfaces, thus at once lifting the blades out of the soil and causing the machine to run upon the surface, thereby greatly facilitating the handling of the machine.

If desired, means may be provided for locking the single roller shown in Figs. 3 and 4 from rotation so as to cause said device to operate as a drag.

In the form of device shown in Figs. 1 and 2, the end disks may be employed at the ends of the rolling cutters to further assist in keeping the machine from moving to the side.

As shown in Fig. 2, of the drawings, I also prefer to provide means for permitting a vertical movement of the spiral cutters within their bearings, so as to permit said cutters to yield in case they strike against a stone or other obstacle. As shown in said figure, the bearings at the ends of the shaft are slotted so as to permit of a considerable vertical play of said shaft, and spiral springs $s\ s$ are located above the ends of said shaft, so as to press said shaft downwardly and hold the cutters in contact with the soil. In this manner, the cutters are permitted to yield when they strike against any unusual obstruction, but are held against the soil firmly enough to insure a perfect operation of the cutters.

Having described my invention, what I claim as new, and desire to secure by Letters Patent of the United States, is—

1. In a harrow, the combination with a frame constructed as described, of rotary cutters or pulverizers D, arranged in pairs transversely within said frame, and having spirally curved concavo-convex blades made in sections twisted in opposite directions, so that the rear pair shall move in reverse with the pair in front, and mounted upon sleeves D', on transverse shafts $d$, rigidly secured in squared bearings $d^2$, in the side bars of the frames, and flat sharp edged disks, of greater diameter than the cutters, located outside of the cutters, and adapted to cut into the surface of the soil, all as described.

2. In a harrow, the combination with a frame constructed as described, having a longitudinal cross bar, and provided with a reversible yoke and tongue, of revolving cutters or pulverizers arranged transversely within said frame in sections or pairs, each of said cutters being composed of two sections provided with continuous, oppositely twisted spiral concavo-convex blades, said cutters being so arranged as that each section of the rear cutter, twisted in different directions, shall follow the oppositely twisted section of the forward cutter and means for locking said cutters on the shafts through the sleeves D', and the set screws $d'$, all as described.

3. In a harrow, the combination with a frame constructed as described, having a longitudinal cross-bar carrying the inner ends of the shafts, of a reversible yoke and tongue, shafts, adjustable by means of bearings E, mounted in the frame, cutters or pulverizers mounted on the shafts and arranged transversely within said frame, in sections or pairs, each of said cutters being composed of two sections provided with continuous, oppositely twisted, spiral concavo-convex blades, said cutters being so arranged as that each section of the rear cutter, being twisted in a different direction, shall follow the oppositely twisted section of the forward cutter, means for locking said cutters on the shafts through the sleeves D', and set screws d', and springs s, interposed between the shafts and frame in slots in the frame, all as hereinbefore described.

4. In a combined harrow and clod crusher, the frame A, constructed as described, provided with the reversible yoke B, the adjustable shafts d, secured in the squared bearings $d^2$, in the side bars, the continuous oppositely twisted spiral concavo-convex rolling blades, arranged in pairs, each cutter of the rear pair having a reverse twist from that of the one in front, whereby each has an opposite thrust from the adjacent ones, said blades D, mounted on the sleeve D', having the locking screws d', whereby from the concavo-convex shape of said rolling blades, the machine, by reversing the yoke and pole, is changed from a harrow, to a clod crusher, all combined and arranged as hereinbefore described.

In testimony that I claim the foregoing I have hereunto set my hand, at Milwaukee, in the county of Milwaukee and State of Wisconsin, in the presence of two witnesses.

BENJAMIN R. BONES.

Witnesses:
   H. G. UNDERWOOD,
   JOHN E. WILES.